United States Patent [19]

Halldorsson et al.

[11] Patent Number: 4,717,252

[45] Date of Patent: Jan. 5, 1988

[54] METHOD AND APPARATUS FOR DETECTING DISTANCE AND FORMING IMAGE OF OBJECT IN TURBID MEDIUM USING LASER

[75] Inventors: Thorsteinn Halldorsson; John Langerholc, both of Munich; Sigmund Manhart, Haar; Ernst-August Seiffarth, Taufkirchen, all of Fed. Rep. of Germany

[73] Assignee: Messerschmitt-Bölkow-Blohm GmbH, Fed. Rep. of Germany

[21] Appl. No.: 744,113

[22] Filed: Jun. 12, 1985

[30] Foreign Application Priority Data

Jul. 7, 1984 [DE] Fed. Rep. of Germany ....... 3425098

[51] Int. Cl.$^4$ ................................................ G01C 3/08
[52] U.S. Cl. ........................................... 356/5; 342/22
[58] Field of Search ................. 356/3, 4, 5; 342/22, 342/26, 159, 160; 354/403

[56] References Cited

U.S. PATENT DOCUMENTS 4,139,847  2/1979  Shimzu et al. .................... 342/26
4,289,397  9/1981  Itzkan et al. ...................... 356/5

Primary Examiner—L. T. Hix
Assistant Examiner—David M. Gray
Attorney, Agent, or Firm—McGlew and Tuttle

[57] ABSTRACT

A method and system is used for detecting the presence of measuring the distance to and producing an image of, objects which, while being strongly absorbing or reflecting themselves, are hid from sight in a medium which is strongly dampening due to light dispersion, such as submersed submarines. The method provides, in addition to detecting the reflection from the surface of the object, a full acquisition of the variation of the backscatter of scanning laser pulses by the medium surrounding the object, with laser pulse transmitters operating with a much larger pulse duration, being usable for this purpose.

6 Claims, 7 Drawing Figures

METHOD AND APPARATUS FOR DETECTING DISTANCE AND FORMING IMAGE OF OBJECT IN TURBID MEDIUM USING LASER

FIELD AND BACKGROUND OF THE INVENTION

The present invention relates in general to imaging and detection equipment and methods, and in particular to a new and useful method and system of detecting the distance to and forming an image of objects in turbid and light attenuating mediums, utilizing laser light. Such turbid medium include the atmosphere on cloudy days for example and ocean water.

Under such conditions, a significant amount of light signals to be used for ranging and image formation, are strongly attenuated by dispersion along the transmission path and accompanied by disturbing scatter signals from the medium itself.

There are known distance measuring systems, from German patents and disclosures 26 34 627; 31 03 567; 32 19 452, for determining the time interval that has elapsed between a short reference laser pulse and a largely identical measuring pulse which is formed from the scattered light of the target object. It is sought in these references, to minimize the error in measuring of this time interval.

As is known, the range of a distance measurement with lasers in the atmosphere or a body of sea water, such as in laser-radar, lidar, and laser range finder methods, depends on the degree of turbidity of the transmitting medium much more than do microwave, or millimeter-radar, or solar methods. This is a disadvantage primarily in the military domain where hostile targets are to be detected with a scanning laser beam quickly and exactly, mostly under conditions of bad visibility. Considered in this connection are only the conventional systems based on the pulse travel time, where short pulses or pulse trains are directed from a laser transmitter in the direction of the target, and a receiver coaxial with or parallel to the axis of transmission is provided by which the reflected pulses are received, with this response being evaluated, in area scanning systems, as an image spot, and in systems with a rigid axis, as a distance, by a travel time measuring device.

The detection of laser echo signals upon scanning in turbid mediums is rendered difficult by two phenomena:

First, by the strong damping, or exponential attenuation, of the signal on its go and return travel through the medium, requiring mastering of high signal dynamics, and second, by a strong backscatter which is caused by the medium itself along the trace of the pulse to the target and which, while non-homogenously varying in time, produces signals that are frequently hard to distinguish from the echo signals coming from the target surface.

SUMMARY OF THE INVENTION

The present invention is directed to a substantial improvement in detecting, and suppressing the probability of a spurious alarm, in scanning radar systems such as in those employed for locating submarines from aircrafts or finding targets in a very turbid atmosphere on the ground, and at the same time to completely acquire not only the usually weak reflection of the object, but also the substantially stronger variations of the backscatter of the medium itself, i.e. of the water and/or air.

Accordingly, an object of the present invention is to provide a method for detecting an object in light attenuating medium comprising generating laser pulses in a concentrated beam, scanning the beam through the medium and at a target to form backscatter signals from the medium and the target, recording the backscatter signals, measuring variations in time in the backscattered signals and responding to variations which are above a usual level, the variations being indicative of the presence of a target.

A further object of the invention is to provide an apparatus for detecting an object in light attenuating medium which comprises a photo-receiver for receiving the backscatter signals, a logarithmic amplifier for amplying the backscatter signals, a first time delay branch for receiving the signals and applying a selected time delay to the signals, and a second branch, with a differential amplifier connected to both branches for comparing the time delayed signal with the non-delay signal, the output of the differential amplifier being utilized as an indication of the presence of a target where the difference between the delayed and non-delayed signal are above a threshold value.

Another object of the invention is to provide such an apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings.

Embodiments of the invention are explained as illustrated as follows.

DESCRIPTION OF THE PREFERRED EMBODIMENTS

Figure 1A:
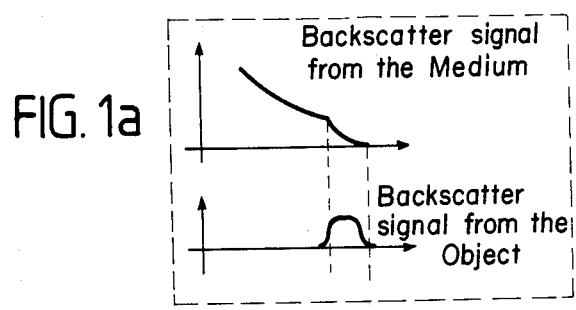
FIG. 1a is a diagram indicating the backscatter from the medium and from the object or target to be detected.
Figure 1B:
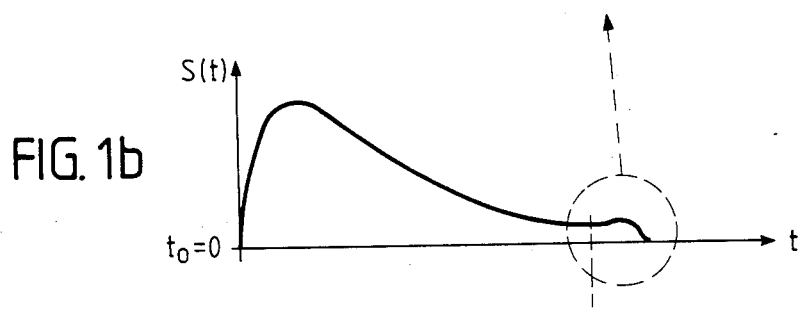
FIG. 1b is a diagram of the entire backscatter signal as a time function.

To make clear the method and advantages of the invention over the prior art, it is useful first to consider the backscatter signals as shown in FIG. 1b of a laser-radar system, coming from a turbid medium and varying in time. At an instant to in FIG. 1b at to=0, the start of the backscatter signal of the leading edges of the short pulses of the laser transmitter from the boundary of the body of turbid medium (sea level, fog bank) is detected by the laser receiver. While the pulse penetrates into the medium, the signal rises continuously due to the backscatter from the medium, up to a maximum at which the pulse has entirely penetrated into the medium. In the further progress of time, the signal drops exponentially with time, i.e., $$S(t) \sim e^{-\Gamma C't} \quad (1)$$

wherein $\Gamma$ is the damping coefficient of the medium, and $C'$ is the speed of light in the medium. At the instant (considered from the observer):

$$t_D = \frac{2D}{C'}$$

Figure 2:
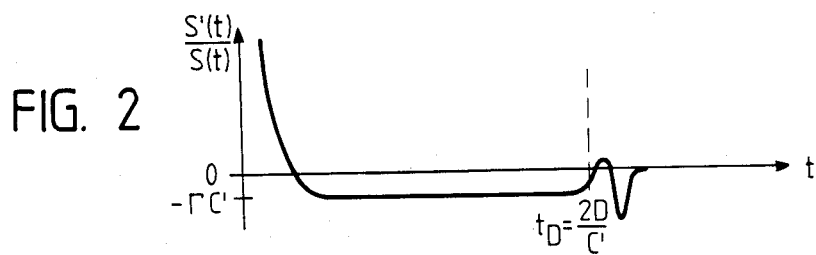
FIG. 2 is a diagram of the standard derivative in time of the signal.

As shown in FIG. 2, the leading edge of the pulse has reached an object at the depth D, whereupon, in further development, the following happens: first, at the end of the time corresponding to the pulse width $t*$, the backscatter from the medium drops to zero (see FIG. 1a) and second, the surface of the object reflects or disperses a portion of the pulse energy, with this signal from the object having exactly the same shape in time as the transmitted pulse, as shown in FIG. 1a. The two signal variations result in a variation shown in FIG. 1b, namely $$\epsilon(t_D) = \frac{S^{Medium}(T_D)}{S^{Object}(t_D)} = \frac{\pi\beta(\pi)}{2\Gamma\rho}[e^{\Gamma C't*} - 1] \quad (2)$$

wherein $\beta(\pi)$ is the backscatter coefficient, and $\rho$ is the degree of reflection of the object.

A mathematical evaluation of this relation by substituting known data of $\beta(\pi)$ and $\Gamma$ for various turbid mediums shows that in mediums having a damping of $\Gamma \geq 0.1$ m$^{-1}$, a ratio of $\beta(\pi)\Gamma \geq 10^{-2}$ sr$^{-1}$, and a pulse duration $t* \geq 5$ ns, the backscatter signal variation significantly exceeds the reflection by the object. It is to be noted that the reflection from an object scatters mostly isotropically in all spatial directions, so that only a small proportion reaches the field of vision of the receiver, while the backscatter of the medium mostly forms a distinct lobar beam in the rearward direction having a beam angle of a few degrees only, so that a correspondingly high proportion of the scattered light of the medium falls into the angular field of the receiver.

A comparison with known military data for turbid seawater and artificial fog shows that at wavelengths in the visible and near infrared regions, this ratio distinctly exceeds one. To take an example, typical data for the seashore waters of the Baltic Sea are $\Gamma = 0.25$ m$^{-1}$ and $\beta(\pi) = 10^{-1}$m$^{-1}$. With a laser pulse length of $t* = 30$ ns and a degree of reflection of the object of $\rho = 0.1$, $\epsilon D = 33$.

This result makes evident that by using relatively long laser pulses and a signal evaluating device designed to detect signal variations over time intervals corresponding to the length of the laser pulse, considerably clearer signal echos from objects can be obtained than with short pulse methods.

It will be understood of course, that this improvement in object detection entails a reduced accuracy in the determination of the distance between the object and the observer, which is proportional to the duration of the laser pulse. However, distance accuracy may be restored again by averaging a number of individual measurements of a pulse train.

Since conventional signal evaluating devices are designed for pulses of minimum duration, with a high peak power, which are momentarily reflected from the object, the invention provides a system which is best adapted to the above described detection of the relatively long scatter signals. Surprisingly, this can be obtained in a simple way by forming the quotient of the lagging signal and directly transmitted measuring signal, with the necessity, of course, to adjust the time delay to the damping parameters of the medium and the laser pulse duration.

The new method may best be explained in comparison with the prior art methods.

Because of the high dynamic of the received signals, the signal amplification is usually augmented after the emission of a laser pulse, from a low value gradually to growingly higher gains, as a function of the pulse travel time. This operation is usually effected by means of an amplifier having a logarithmic characteristic, i.e. the natural logarithm is formed of the received time-dependent signal: log S(t). The original signal exponentially dropping in the scattering medium is thereby linearized, i.e. $-\Gamma c't$ is formed from the $e^{-\Gamma c't}$. Now, to detect the reflection or the fast damping of the signal on the object, the signal is in addition differentiated, so that the signal from the scattering medium becomes linear, while a transient appears as an object as shown in FIG. 2. From the relation:

$$\frac{d \log S(t)}{dt} = \frac{S'(t)}{S(t)} \quad (3)$$

It may be learned that the resulting signal represents the standardized time derivative of the received signal (i.e. the instantaneous slope of the signal curve). The disturbance in the signal caused by the object is finally detected by registering the zero passage or by raising the signal above a fixed signal discrimination level.

It will be understood that this manner of signal evaluation is suitable for detecting very quick signal variations, i.e. signal rise or decay, but is almost indifferent to relatively slow variations of the signal.

While observing the usual signal variation involving an object in a strongly dispersing medium, as shown in FIG. 1b, it will be noted that at the instant at which the leading pulse edge reaches the object, the slope change of the curve is relatively small relative to the change caused by the trailing edge meeting the surface of the object, where the signal drops from its peak value to zero. This means that in the above described signal evaluation method, the most important element is the trailing edge of the laser pulse, and that what matters primarily is to have this trailing edge as steep as possible, or, within the same short interval, to have the peak power of the pulse as high as possible.

However, this requirement is not satisfactory in view of the power rating, since only one half of the laser pulse is utilized in the reception. Another disadvantage is that the signal is responsive to any instantaneous variation in the signal, thus also to any transient non-homegeneities in the dispersion which are detected as additional disturbing signals and can only be distinguished with difficulty from object signals.

Figure 3:
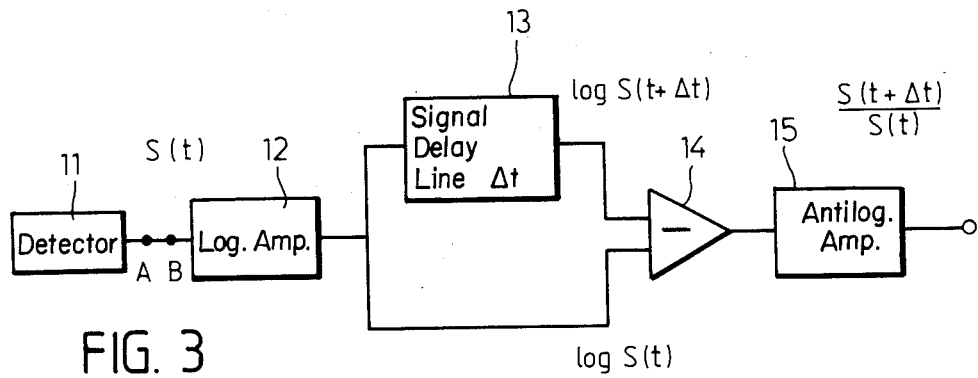
FIG. 3 is a block diagram of a signal evaluating unit for forming a quotient of the lagging signal and the direct signal.

To overcome these drawbacks, or, in other words, to make the maximum portion of the signal utilizable, with, at the same time, a small chance of disturbances, the invention provides a signal evaluating system represented by FIG. 3. From a detector 11 the signal is first directed, as usual, through a logarithmic amplifier 12. Then, the signal is split into two branches, and passes in one of the branches through a signal delay line 13, so that at the output of this branch, it lags behind the signal passing through the other branch, by a fixed time period $\Delta t$.

Both signals, log $S(t+\Delta t)$ and log $S(t)$ are now subtracted from each other in a differential amplifier 14. The logarithm of the quotient of the two signals is thus formed, which is then inverted in a following analog amplifier 15 to the antilogarithmic quotient $$\epsilon(t) = \log^{-1} \log \frac{S(t + \Delta t)}{S(t)} = \frac{S(t + \Delta t)}{S(t)} \qquad (4)$$

Figure 4A:
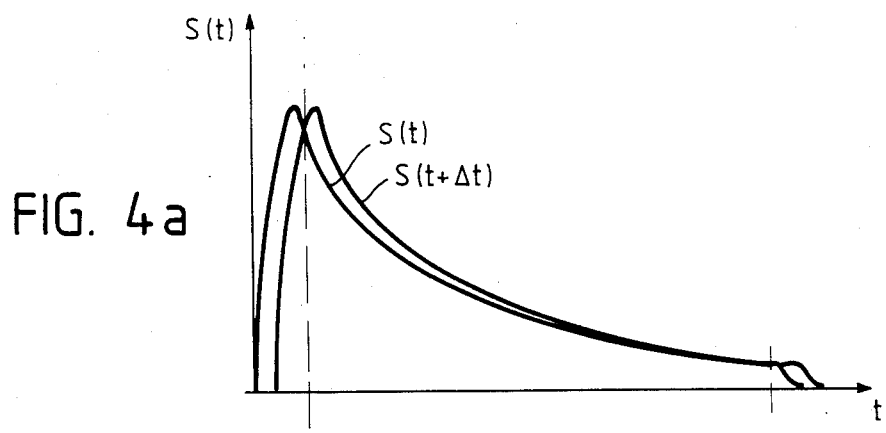
FIG. 4a shows the variation in time of the direct and the lagging signals.
Figure 4B:
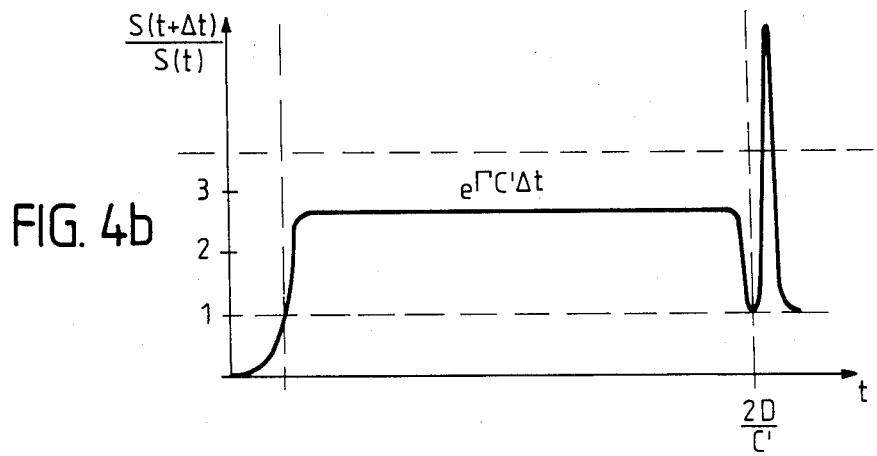
FIG. 4b shows the variation in time of the quotient of the lagging and the direction signals.

FIG. 4a shows both the direct and the lagging signal, and FIG. 4b shows their relation $\epsilon(t)$. It may be learned from FIG. 4b that $\epsilon(t)$ increases from zero through the value 1 (where the signals cross each other) up to a constant value of $e^{\Gamma C \Delta t}$ before the laser pulse encounters the surface of the object.

During the short time interval in which the laser pulse meets the surface of the object, initially, the direct signal generally slightly increases due to an additional content of the dispersion of the object. During the same interval, however, the lagging signal still decreases, i.e. the ratio increases to a maximum. Later, the two signals drop to zero and the ratio becomes one.

With the lag $\Delta t$ chosen to be approximately equal to the pulse length $t_*$, the entire change in the signal at the object is concentrated to the transient of the quotient. To determine the reference instant at which the pulse reaches the object, any of the conventional methods may be used, such as the signal maximum detection, pulse amplitude, discrimination, center of gravity determination, etc. A genuine comparison of this method with the above method is obtained if the value 1 is subtracted from the ratio $\epsilon(t)$, which does not disturb the signal variation curve:

$$\epsilon(t) - 1 = \frac{S(t + \Delta t)}{S(t)} - 1 = \frac{S(t + \Delta t) - S(t)}{S(t)} \qquad (5)$$

It follows from this term that the curve represents the standardized difference between the lagging and the direct signals, with the above standardized derivative being obtainable as $$\frac{[\epsilon(t) - 1]}{\Delta t} = \frac{S'(t)}{S(t)} \qquad (6)$$

The substantial advantage of this method over the prior art methods is that with a correct setting of the time delay, the method is applicable to both short and long pulses, and that the entire signal change, through object reflection and discontinuance in the medium backscatter, is utilized. Another advantage is that signal disturbances caused by non-homegeneities in the disperspersing medium can be averaged through a correct adjustment of the time lag $\Delta t$.

As in any laser measuring performed during daytime in the atmosphere, a measurement in accordance with the invention is disturbed by this background. The invention therefore provides an effective optical suppression of the background by interference filters having a stop band outside the laser wavelength. In addition, an electronic elemination of the background level is provided through a signal subtractor, as indicated in FIG. 5.

Figure 5:
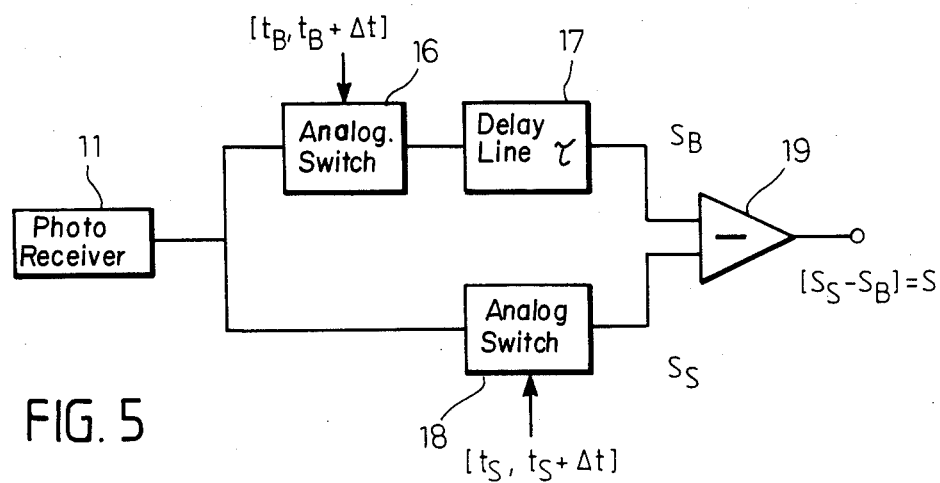
FIG. 5 is a block diagram of a signal evaluating unit for subtracting the optical background from the useful signal.

In FIG. 5, a signal subtracter is shown connected to the output of the photoreceiver 1 and the logarithmic amplifier which is shown at 12 in FIG. 3. The signal subtracter comprises two analog switches 16 and 18 which are alternately actuated and which are provided in two signal branches. The signal of the optical background is further directed by one of the analog switches 16 and a definite time interval prior to transmitting the scanning laser pulse, through a signal delay line 17 which is so designed that during the pulse measuring time, which is started by actuating the second analog switch 18, both signals, namely the pulse signal and the background signal, can be subtracted from each other by means of a differential amplifier 19.

This circuitry is inserted between points A and B of FIG. 3. The laser and the two analog switches 16, 18 are timed by a common clock. $\tau$ indicates the time delay between the background and the useful signal, and 19 is the differential amplifier 10 by which the two signals are subtracted from each other.

While specific embodiments of the invention have been shown and described in detail to illustrate the application of the principles of the invention, it will be understood that the invention may be embodied otherwise without departing from such principles.

What is claimed is:

1. An apparatus for detecting an object in light attenuating medium which object has been illuminated by a concentrated pulsed laser beam to form backscatter signals due to the presence of the light attenuating medium and the presence of the target, comprising a photoreceiver for receiving the backscatter signals, an electronic logarithmic amplifier connected to said photoreceiver for amplifying the received backscatter signals, a first time delay branch connected to said amplifier for receiving the amplified signals and applying a selected time delay to the signal, a second non-delay branch for receiving the amplified signals, a differential amplifier having a first input connected to said first branch and a second input connected to said second branch for forming a difference between the time delay and non-delay signals, and an analog amplifier connected to the differential amplifier for amplifying the difference between the signals and to form a quotient of the two signals.

2. An apparatus according to claim 1, including signal subtracter means connected between said photoreceiver and said logarithmic amplifier, said signal subtracter means comprising a pair of branches for receiving a signal from said photoreceiver, an analog switch in each of said branches and a signal delay line in one of said branches for delaying the signal in that one branch, said analog signals being actuated alternately at a selected time interval, and a further differential amplifier connected to each of said pair of branches for taking a difference between signal from each of said pair of branches and applying the difference to an input of said logarithmic amplifier.

3. An apparatus according to claim 2, including an interference filter associated with said photoreceiver for suppressing light signals which are outside a wavelength of the laser pulses.

4. A method of detecting an object in light attenuating medium comprising generating laser pulses in a concentrated beam, scanning the beam through the medium which may contain a target for forming backscatter signals from the medium and from any target which might be present, recording the backscatter signals for each pulse of the beam, and using an entire variation in time of the backscatter signals for each pulse to detect the presence of a target in the medium, the detection being responsive only to a signal representing a non-uniformity in the variation in time of backscatter signal which represents the presence of a target, and including splitting the backscatter signal into a first time delay branch and a second delay branch, forming a quotient of the time delay and non-delayed signals, the amount of time delay being variable and adjustable to damping parameters of the medium and to a duration of the laser pulses in the beam.

5. A method of detecting, measuring the distance to and producing an image of, objects which may be both light absorbing and light reflecting and which are hidden from sight by a medium which strongly dampens light due to light dispersion, while employing a pulsed laser as a radiation source, characterized by recording backscatter signal from the medium while it is scanned with a concentrated, pulsed laser beam in a manner such that an entire variation in time of the backscatter is used for detecting an object present in the medium, by making the detecting system responsive only to a signal which is representative of non-uniformity of the object, by splitting the received backscatter signal, causing one of the split signal parts to lag in time, and forming the quotient of the lagging and the non-lagging measured signals, with the amount of lagging being variable and adjustable to damping parameters of the medium and to the laser pulse duration.

6. A device for detection, range measurement and mapping of objects that may be either absorbing light or reflecting light and are hidden in a heavily muffling medium due to light scatter, the device using a pulsed laser as a source of light, comprising: a photo-receiver adapted to receive a back scatter signal; an electronic signal log amplifier having an input connected to an output of the photo receiver for splitting the received back scatter signal into two paths; a first signal path including a time lag line; a second, undelayed, signal path, the outputs of said first and second signal paths each connecting to a differential amplifier so as to calculate the difference between the two logarithmized signals; an analog amplifier connected to the output of the differential amplifier to generate the ratio of the delayed signal to the undelayed signal.

* * * * *